United States Patent

[11] 3,571,884

| [72] | Inventor | Jackson Chung<br>Mishawaka, Ind. |
|---|---|---|
| [21] | Appl. No. | 764,726 |
| [22] | Filed | Oct. 3, 1968 |
| [45] | Patented | Mar. 23, 1971 |
| [73] | Assignee | Reliance Electric Company |

[54] SHEAVE FLANGE OPENING DEVICE
12 Claims, 7 Drawing Figs.

[52] U.S. Cl.................................................. 29/200,
29/227, 74/230.17, 254/10.5
[51] Int. Cl..................................................... B23p 19/00,
B23b 19/04
[50] Field of Search........................................... 29/200,
227, 200 (P), 200 (J); 254/10.5; 74/230.17

[56] References Cited
UNITED STATES PATENTS
3,099,875  8/1963  Lelis........................... 29/227

3,368,266  2/1968  Shultz........................... 29/200

*Primary Examiner*—Thomas H. Eager
*Attorneys*—Marmaduke A. Hobbs and Kemon, Palmer and Estabrook ABSTRACT: A device for opening the flanges of a variable pitch sheave having two axially movable flanges urged toward one another by a spring means. The device, consisting of a screw-operated mechanism, may be mounted on and removed from the sheave, and is operable to apply pressure to the opposing flanges in the direction to open the flanges and to hold the flanges in open position while the sheave is being assembled on a shaft and a belt is being mounted and positioned on the sheave. After the installation of the sheave has been completed, the device is removed from the sheave, which thereafter operates in the normal manner.

INVENTOR.
JACKSON CHUNG
BY
M. A. Hobbs
ATTORNEY

INVENTOR.
JACKSON CHUNG
BY M.A. Hobbs
ATTORNEY

INVENTOR.
JACKSON CHUNG
BY
ATTORNEY

SHEAVE FLANGE OPENING DEVICE

In the installation of variable or adjustable sheaves having two axially movable flanges urged together by a spring means, the belt is placed on the sheave while the flanges are being urged to their innermost position by the force of the spring means. In the past, the flanges were usually forced apart by prying with a bar or other means to permit the belt to be placed over the flanges and into the flange groove; however, substantial resistance and considerable difficulty were encountered in retaining the flanges apart while installing the belt, and as soon as the force separating the flanges was released, the flanges returned to their original closed or substantially closed position, thus placing the belt under tension, often before the belt was fully installed and placed in proper operating position. In a normal installation operation, the belt is sometimes assembled while the flanges are in substantially closed position. This requires the installation and adjustment of the belt to be made while the belt is under tension. It is therefore one of the principal objects of the present invention to provide a device for opening the flanges of sheaves of the aforementioned type, which can easily be mounted on the sheave and thereafter conveniently operated to open the flanges to any degree for receiving the belt, and which will retain the flanges in full or any partially opened position until the sheave and belt installing operation has been completed.

Another object of the invention is to provide a flange opening device for variable pitch sheaves, which is simple in construction and operation and which reliably retains the flanges in any selected open position, and is so constructed and designed that it does not interfere with the operation of installing the sheave or belt.

Still another object of the invention is to provide a flange opening device of the aforementioned type which can easily be assembled on and removed from a sheave for servicing the sheave and belt installation, and which can be installed and adjusted without the use of any special tools or training, and without removing or releasing the sheave from the shaft or drive on which it is mounted.

Additional objects and advantages of the invention will become apparent from the following description and accompanying drawings, wherein.

Figure 3:
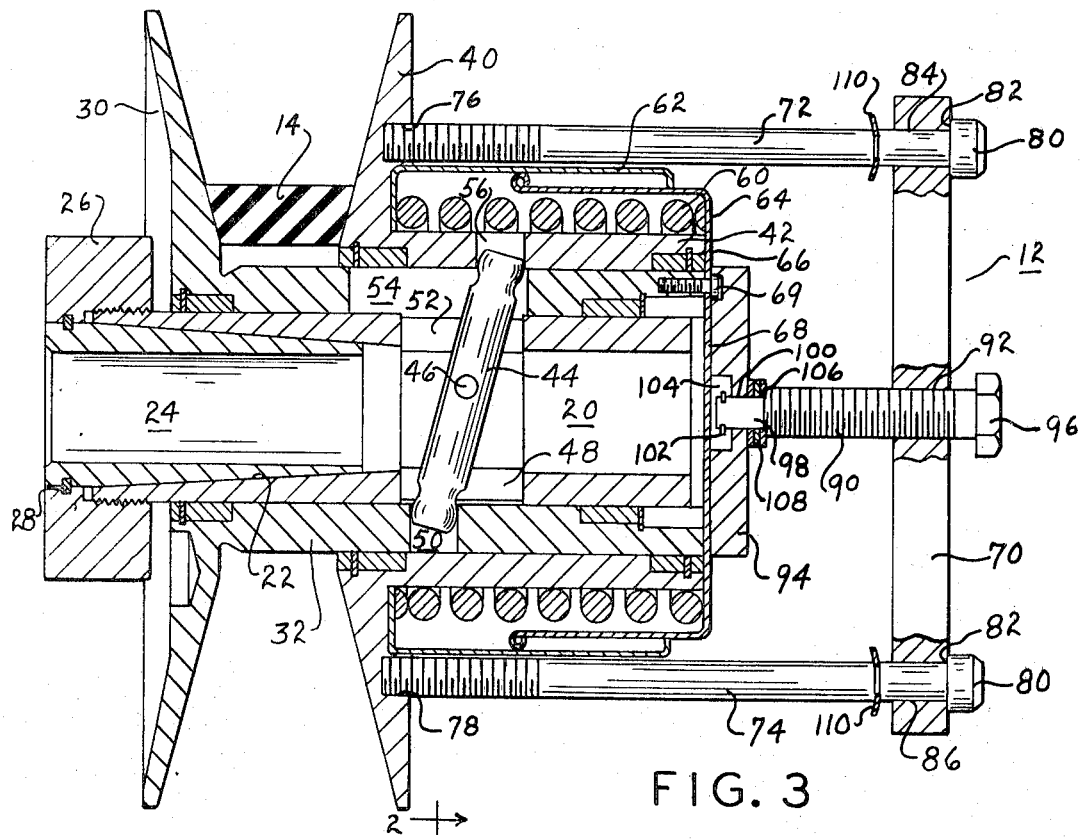
FIG. 3 is a cross-sectional view similar to the cross-sectional view of FIG. 2 showing the flanges of the sheave held in open position by the present device.

Referring more specifically to the drawings, numeral 10 indicates generally a sheave on which the present flange opening device 12 is mounted. The present device is designed for use on a spring-operated variable pitch sheave in which the two flanges of the sheave are simultaneously shifted axially toward and away from a center line for the belt 14. While various designs of sheaves of this general type may be operated by the present flange-opening device, the sheave shown in the drawings consists of a hub 20 having an axial bore and a tapered internal surface 22 for receiving a tapered split bushing 24. The bushing slips onto the end of a shaft and the sheave is secured in place by the contraction of the tapered internal surface as the sleeve is forced inwardly by nut 26 threaded onto the external end of the hub, the nut being rotated relative to the sheave and connected thereto by a snap ring 28.

Mounted on the external surface of hub 20 is an inner flange 30 and a sleeve 32 connected integrally to the flange and movable axially on the hub. Mounted on the external surface of sleeve 32 is an outer flange 40 and a sleeve 42 joined integrally to flange 40 and extending axially along the outer surface of inner sleeve 32. The two sleeves are operatively interconnected by an equalizing bar 44 pivoted on a pin 46 seated in the opposed walls of hub 20. The lower end of bar 44 as viewed in FIGS. 2 and 3 extends through a slot 48 in hub 20 into a slot 50 in sleeve 32. The upper end of bar 44 extends through a slot 52 in hub 20 and through a slot 54 of inner sleeve 32 into a slot 56 of outer sleeve 42. With the two sleeves interconnected by bar 44 in the manner indicated, movement of one sleeve axially along the hub causes a corresponding but opposite movement of the other sleeve in the axial direction. This movement causes a corresponding movement of flanges 30 and 40 toward or away from one another to vary the pitch of the sheave.

The two flanges are urged together toward one another by a coil spring 60 disposed in a telescopic housing 62 and reacting between the flange 40 and an abutment 64 formed by the inner end of cup-shaped portion 66 of housing 62. The end member 68 of housing 62 is secured to the inner sleeve 32 by a plurality of bolts 69 extending through the end into threaded holes in the end of the sleeve. As the spring urges the flanges toward one another, they are moved equally on opposite sides of a vertical center line between the flanges on which the belt travels. The flanges are urged away from one another against the force of spring 60 when the belt is tightened, forcing it inwardly along the internal surface of the two flanges.

In installing the sheave described herein, the sheave is first mounted on the end of a shaft and secured thereto by tightening collar 26. The conventional method of installing the belt requires the flanges to be forced apart by prying the two flanges outwardly away from one another with a heavy instrument such as a crowbar or a wooden two-by-four. This method has been found in the past to cause damage to the sheave flanges and/or belt. Further, this prior method has been inconvenient in that it is difficult to use effectively the prying instrument without interfering with the installation and positioning of the belt. Thus, the sheave and belt are occasionally misaligned or otherwise improperly installed.

In order to overcome the foregoing difficulties and disadvantages, the present flange opening device is used, which consists of a crossmember 70 secured to flange 40 by two longitudinally positioned bolts 72 and 74 threaded in two openings 76 and 78, respectively, of flange 40. Each of the bolts is provided with a head 80 having inwardly facing shoulder 82 which seats on the external surface of bar 70 around holes 84 and 86 for the two bolts. A screw 90 axially aligned with hub 20 is threadedly received in an opening 92 in bar 70 and is adapted to apply axial pressure on sheave 30 through an inner bar or plate 94 as the screw is threaded inwardly, i.e. toward the left as viewed in FIG. 3, using a wrench on head 96. The inner end 98 of screw 90 extends through an opening 100 of bar 94 and is rotatably secured to the inner bar by a snap ring 102 in a recess 104. The crew 90 is provided with a shoulder 106 which seats on a plurality of washers 108, which in turn seat on the external surface of bar 94 for applying pressure to the bar. The bar, which is in firm engagement with end member 68, applies pressure to the member and thence to the end of sleeve 32. A collar, such as a snap ring 110, is preferably used on the inner side of bar 70 to retain bolts 72 and 74 in place when the device is not mounted on a sheave.

Figure 2:
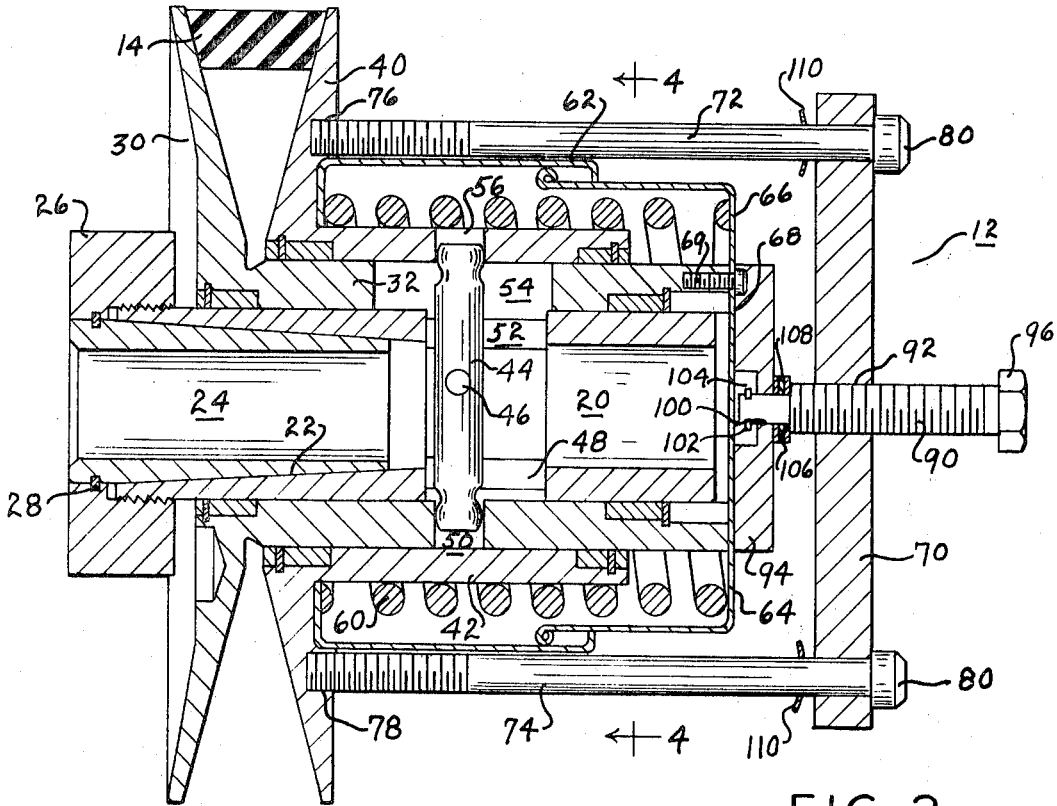
FIG. 2 is a longitudinal cross-sectional view of a variable sheave having the present device mounted thereon, ready to open the flanges, the section being taken on line 2-2 of FIG. 1.
Figure 4:
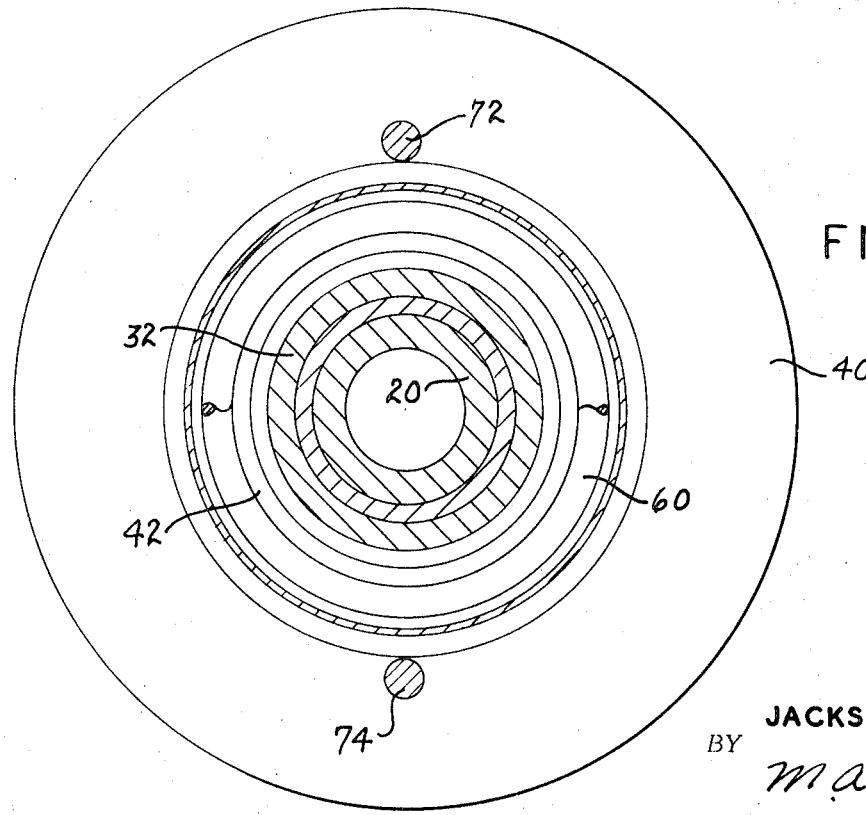
FIG. 4 is a transverse cross-sectional view of the sheave shown in the preceding FIGS., the section being taken on line 4-4 of FIG. 2.

In the operation of the present flange-opening device, the two bolts 72 and 74 are inserted in holes 76 and 78 of flange 40, in the manner illustrated in FIGS. 2 and 3, and tightened therein. Screw 90 is then screwed inwardly, i.e. to the left as viewed in FIGS. 2 and 3, seating bar 94 on the end member 68 of housing 62. This permits bar 94 to apply a positive force to the end of sleeve 32, and upon further turning of screw 90 in hole 92, sleeve 32 is moved to the left as viewed in FIGS. 2 and 3, thus simultaneously compressing spring 60. The equalizing bar 44 causes a corresponding movement of sleeve 42 and flange 40 in the opposite direction, thus moving the two flanges equally in opposite directions from a center line between the two flanges, which is the center line for the belt. Threading of screw 90 in threaded hole 92 causes the flanges to move from the position illustrated in FIG. 2 to the position illustrated in FIG. 3, with the flanges wide open. While the flanges are held in wide open position the belt may be placed between the two flanges in the position illustrated in FIG. 3, near the inner edges of the flanges. This permits substantial slack in a flexing of the belt so that it can be placed on the drive and driven sheaves without encountering resistance or engaging in practices likely to cause damage to the sheave or belt.

After the sheave has been tightened and secured in place and the belt properly installed, the screw 90 is turned to retract it and bar 94 from the end of sleeve 42, thus permitting spring 60 to urge flange 40 to the left as viewed in FIGS. 2 and 3, and through equalizing bar 44 to move flange 30 a corresponding amount to the right. After sufficient tension has been placed on the belt to counteract the force of spring 60, an equilibrium is reached, and the further retraction of screw 90 disengages the bar 94 from end member 68. The two bolts 72 and 74 are then removed from the holes in flange 40 and the device thus disassembled from the sheave. Thereafter, the sheave is ready for normal operation. In the event that servicing requires removal and/or replacement of the belt, the flange opening device 12 can readily be reinstalled on the sheave and operated in the foregoing manner to permit convenient adjustment and positioning of the sheave and belt.

Figure 1:
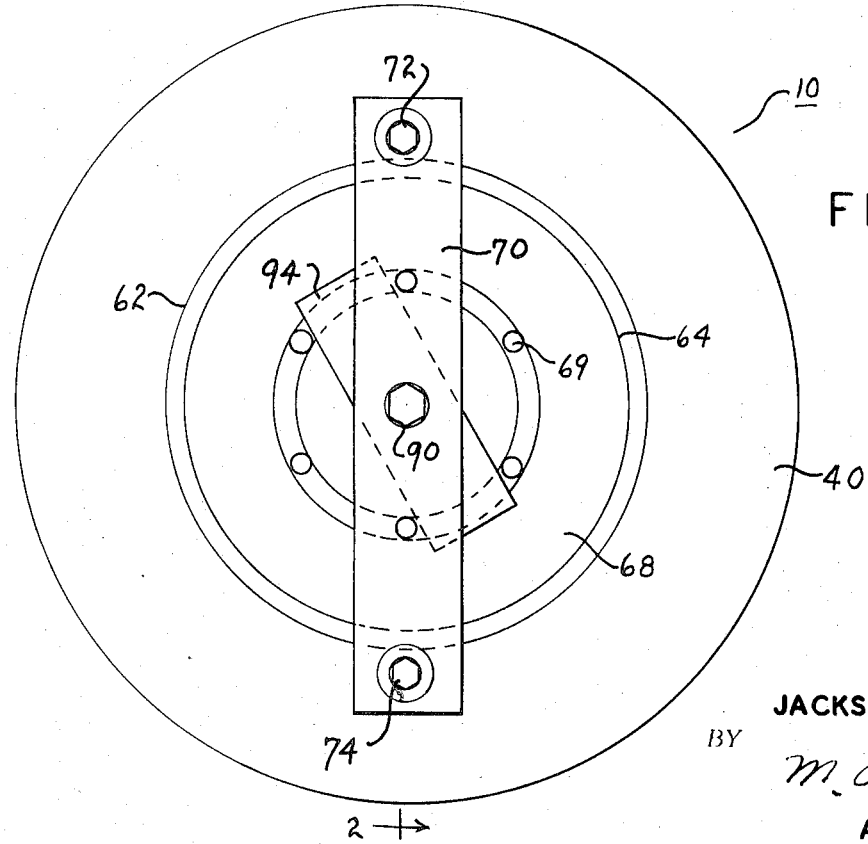
FIG. 1 is an end elevational view of a variable sheave having the present flange opening device mounted thereon.
Figure 5:
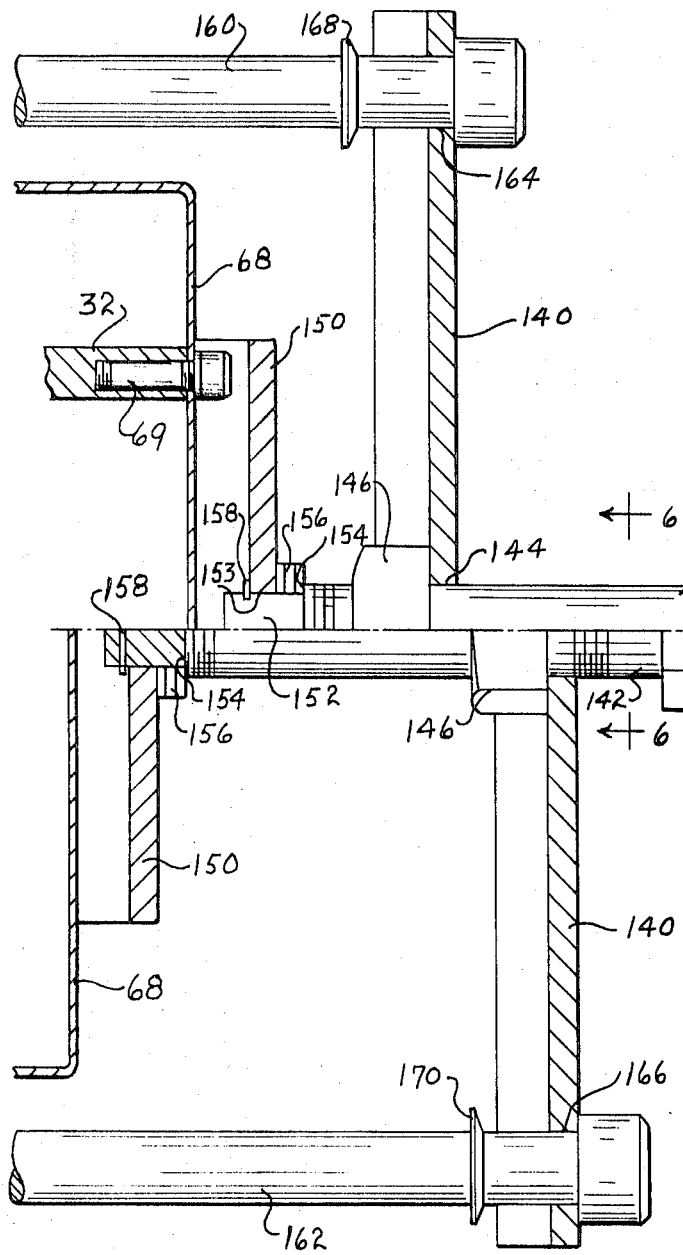
FIG. 5 is an enlarged fragmentary composite cross-sectional view showing a modified form of the present invention.
Figure 6:
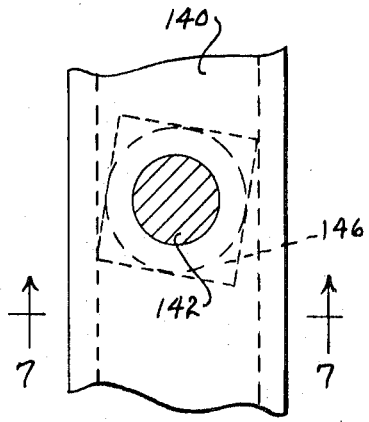
FIG. 6 is a fragmentary elevational view of the modified form shown in FIG. 5.
Figure 7:
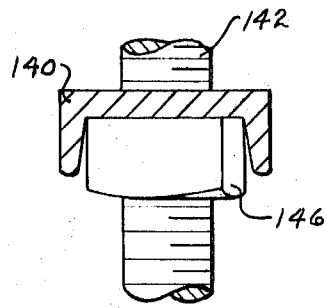
FIG. 7 is a fragmentary cross-sectional view taken on line 7-7 of FIG. 6.

The modification shown in FIGS. 5, 6 and 7 is essentially the same as the embodiment of the preceding FIGS. except that in the modification a simplified structure is used. In the modified form, bar 140 is constructed of channel iron and screw 142, extending through a center hole 144 therein, has a nut 146 on the inner side of the bar. The inner end of the screw abuts against a crossbar 150 and the inner end 152 extends through hole 153 in the center of the bar. The screw is provided with a shoulder 154 which seats on a series of washers 156 to apply pressure to the external surface of bar 150. A snap ring 158 disposed in a groove in a reduced diameter portion 152 retains the screw and bar 150 operatively together. The outer ends of bar 140 are anchored to the outer flange of the sheave, in the manner illustrated in FIGS. 1 and 2, by screws 160 and 162 which extend through holes 164 and 166, respectively, in the ends of the bar and are retained therein by washers 168 and 170.

The operation of the modified form illustrated in FIGS. 5, 6 and 7 is essentially the same as that of the device illustrated in the preceding FIGS.; i.e. when the device is mounted on the sheave, tightening of screw 142 applies pressure to bar 150 which in turn applies pressure to the end of sleeve 32, causing flange 30 to move to the left from the center line between the flanges. As flange 30 moves to the left, flange 40 moves to the right a corresponding amount as a result of the operation of equalizing bar 44, as previously described hereinbefore. The device of the modified form retains the two flanges in their open position to permit easy assembly and adjustment of the belt during the installation and servicing of the sheaves. After the sheave has been installed and the belt properly positioned thereon, the flange opening device can readily be removed from the sheave by removing bolts 160 and 162 from the threaded holes of flange 40.

While only two embodiments of the present flange opening device have been described in detail herein various changes and modifications may be made without departing from the scope of the invention.

I claim:

1. A device for opening the flanges of a sheave having two axially movable flanges, a sleeve for each of said flanges attached to the respective flange and extending in the same direction therefrom in concentric relation, and a spring urging said flanges toward one another: said device comprising a crossmember for mounting at the end of said sheave adjacent said sleeves, a plurality of spaced members connected at one end to said crossmember and having means at the other end for connection to the adjacent sheave flange, and a means engaging said crossmember at one end and having means at the other end for engaging the sleeve of the other sheave flange to apply a force to said last-mentioned sleeve for opening said flanges and retaining said flanges in an open position.

2. A device for opening flanges of a sheave as defined in claim 1 in which said plurality of spaced means connecting the member to the adjacent sheave flange includes two bolts extending from said crossmember to said adjacent flange.

3. A device for opening flanges of a sheave as defined in claim 1 in which said crossmember consists of a bar extending transversely at the end of the sheave on the side on which said sleeves are positioned.

4. A device for opening flanges of a sheave as defined in claim 1 in which said means for applying a force to the sleeve of said other flange consists of a screw extending through said crossmember and a pressure applying member seating on the adjacent end of said sheave.

5. A device for opening flanges of a sheave as defined in claim 2 in which said means for applying a force to the sleeve of said other flange consists of a screw extending through said crossmember and a pressure applying member seating on the adjacent end of said sheave.

6. A device for opening flanges of a sheave a defined in claim 3 in which said means for applying a force to the sleeve of said other flange consists of a screw extending through said crossmember and pressure applying member seating on the adjacent end of said sheave.

7. A device for opening flanges of a sheave as defined in claim 2 in which said crossmember consists of a bar extending transversely at the end of the sheave on the side on which said sleeves are positioned.

8. A device for opening flanges of a sheave as defined in claim 5 in which said screw extends through a threaded hole in said crossmember.

9. A device for opening flanges of a sheave as defined in claim 5 in which said screw extends through a hole in said crossmember and through a nut disposed on the inner side of said crossmember.

10. A device for opening flanges of a sheave as defined in claim 6 in which said screw extends through a hole in said crossmember and through a nut disposed on the inner side of said crossmember.

11. A device for opening flanges of a sheave as defined in claim 4 in which said pressure applying member consists of a transversely disposed plated.

12. A device for opening flanges of a sheave as defined in claim 6 in which said pressure applying member consists of a transversely disposed bar.